United States Patent [19]

Halpern et al.

[11] Patent Number: 4,584,643
[45] Date of Patent: Apr. 22, 1986

[54] DECENTRALIZED SYNCHRONIZATION OF CLOCKS

[75] Inventors: Joseph Y. Halpern, Cupertino; Barbara B. Simons, Scotts Valley; Hovey R. Strong, San Jose, all of Calif.

[73] Assignee: International Business Machines Corporation, Armonk, N.Y.

[21] Appl. No.: 560,082

[22] Filed: Dec. 9, 1983

Related U.S. Application Data

[63] Continuation-in-part of Ser. No. 528,282, Aug. 31, 1983.

[51] Int. Cl.$^4$ .............................................. G06F 1/04
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,400,371 | 9/1968 | Amdahl et al. | 364/200 |
| 3,602,900 | 8/1971 | Delaigue | 364/200 |
| 3,761,884 | 9/1973 | Avsan et al. | 364/200 |
| 3,940,743 | 2/1976 | Fitzgerald | 364/200 |
| 4,021,784 | 5/1977 | Kimlinger | 364/200 |
| 4,223,380 | 9/1980 | Antonaccio et al. | 364/200 |

OTHER PUBLICATIONS

Lamport, "Time, Clocks, and the Ordering of Events in a Distributed System", CACM, vol. 21, pp. 558-565, Jul. 1982.
Lamport et al., "Synchronizing Clocks in the Presence of Faults", SRI Technical Reports, 7/13/81.
Rivest et al., "A Method for Obtaining Digital Signatures and Public-Key Cryptosystems", CACM, vol. 21, No. 2, Feb. 1978.
Dolev et al., "A Method for Achieving Multiple Processor Agreement Optimized for No Faults", U.S. application Ser. No. 06/485,573, filed 4/18/83.
IBM Systems Reference Library Manual S/360-29, Catalog No. GC28-8201-4, 5th Edition, copyright Dec. 1972.

*Primary Examiner*—Raulfe B. Zache
*Attorney, Agent, or Firm*—R. Bruce Brodie

[57] ABSTRACT

A method for synchronizing clocks in a distributed computing system in the presence of faults. The condition to be renewed guarantees that all clocks of correct processors never deviate by more than some maximum amount. This condition is achieved by periodically resynchronizing the clocks so that the correct clocks do not deviate by more than some minimum deviation. In the process of resynchronization, a correct clock is never adjusted by more than a maximum amount during a period and it is never set back.

The method requires ascertaining whether a valid time value message has been received within a specified period. A message is valid if it was received within an interval predetermined as a function of the number of signatures from other processors appending the message. If the valid message has not been received within the current period, then the local processor originates and broadcasts to all processors exactly one time value message and appends thereto its unforgeable signature. On the other hand if a valid message has been received, then the local processor appends its unforgeable signature to the message and passes exactly the one message on by broadcasting to all processors. As part of the protocol involving broadcasting of a message, each processor resets the time for expected resynchronization and updates its local clock.

11 Claims, 5 Drawing Figures

METHOD FOR CENTRALIZED SYNCHRONIZATION OF CLOCKS

COMPLETELY CONNECTED NETWORK

METHOD FOR DECENTRALIZED SYNCHRONIZATION OF CLOCKS

GLOBAL FLOW

TIME DIVIDED INTO INTERVALS

4,584,643

DECENTRALIZED SYNCHRONIZATION OF CLOCKS

COPENDING APPLICATIONS

This application is a continuation-in-part of copending application Ser. No. 06/528,282, filed on Aug. 31, 1983, in the name of J. Y. Halpern, B. B. Simons, and H. R. Strong.

TECHNICAL FIELD

This invention relates to the synchronization of clocks in a distributed computing network in the presence of faults, the network processor nodes exchanging information asynchronously.

BACKGROUND

In distributed computing systems, it is assumed that each processor node consults its own internal clock. Since clocks in distributed systems drift apart, they must be periodically resynchronized, that is, brought very close together in value. This resynchronization is necessary in order to carry out many protocols for distributed systems. One such protocol is described in Strong et al, application Ser. No. 06/485,575, filed on Apr. 18, 1983, entitled "A Method for Achieving Multiple Processor Agreement Optimized for No Faults".

In a seminal article, Lamport, "Time, Clocks, and the Ordering of Events in a Distributed System", Vol. 21, Communications of the Association of Computing Machinery, pages 558–565, July 1982, Lamport uses the concept of one event happening before another in order to define a partial ordering of events. Further, Lamport describes a protocol for extending this partial ordering to a total ordering for synchronizing events and then applying this to a system of physical clocks. This guarantees that a set of correct clocks will differ by no more than a specifiable amount.

A paper by Lamport and Melliar-Smith, "Synchronizing Clocks in the Presence of Faults", SRI Technical Reports, published July 13, 1981, describes clock resynchronization in a distributed system in which each processor is required to broadcast its time value. In turn, each processor receives the clock values from every other processor, discards extreme values, and uses an averaging process for synchronization. In order to achieve clock synchronization in the presence of f faults, Lamport requires $(2f+1)$ processors.

Since an averaging process is used, there must be more non-faulty processors than faulty ones for the described technique to work. Note, clock synchronization in this context is simply the condition that clocks differ by no more than a specified upper bound.

In the previously mentioned copending Strong application, there is described a method for achieving Byzantine Agreement among n processors in a reliable $(f+1)$ connected network with guaranteed early stopping in the presence of faults, and eventual stopping for $f+(n/2)$ faults. Byzantine Agreement is a protocol which guarantees that eventually all correct processors will agree on a value. By way of contrast, clock synchronization protocols must guarantee that all correct processors agree (within a specified margin of error) on a time.

Prior art protocols have required a significant quantity of message passing. In the Lamport and Melliar-Smith case approximately $n^{(f+1)}$ messages are exchanged, where n is the total number of processors and f is the number of processor faults.

In the copending Halpern et al application, the described method requires that during each period, the network of processors previously agree upon an ordered list of participants, and that at specified time in the period, the first processor on the list attempts to synchronize all to its own clock. The result of this is either a synchronization of all correct processors (clocks) to be within the desired tolerance or an agreement among all other correct processors that the first on the list has failed. If the first fails, then the second tries, etc.

THE INVENTION

It is an object of this invention to devise a method for clock synchronization in a distributed computing network of n processors in the presence of faults using exchange of information. Said method ought not to require any minimum number of processors in order to handle f processor faults so long as the network remains connected. Relatedly, said method should achieve synchronization using reduced message traffic, be continuously operable in a faulty environment, and avoid averaging.

Faults could be manifest in several ways in centralized synchronization of local clocks. First, the synchronizer could broadcast different messages to different processors, or it could broadcast the same message but at different times, or it could forget to broadcast to some processors. Illustratively, there could be a failure in the synchronizer in the middle of its broadcast of the message "the time is 9:00 a.m.". It could then spontaneously recover five minutes later and continue broadcasting the message. Thus, one-half of the processors would receive the message "the time is 9:00 a.m." at 9:00 a.m. while the other half would receive it at 9:05 a.m. If the role of the synchronizer is distributed, then every correct processor will try to act as a synchronizer at roughly the same time, and at least one will succeed. To insure that this occurs at approximately the same time, the method guarantees that the processors will essentially always agree on the expected time for the next synchronization.

The method of this invention is directed to periodically synchronizing local clocks in a network of counterpart communicating processors (nodes). In this regard, both the drift rate between the clocks and the network message transit and processing times are bounded.

The method steps are executable at each CPU. The first step includes ascertaining whether a time value message has been received within a current synchronizing interval. Next, if said message has not been received within said interval, then the CPU originates and broadcasts to all network connected CPU's exactly one time value message. To this message, the CPU appends thereto its unforgeable signature, resetting the expected time of next resynchronization, and updating its local clock.

The method steps further include ascertaining whether a received message is valid according as to whether said message was received within a period determined as a function of the number of signatures appending the message. Lastly, if said received message is valid, then the CPU appends thereto its unforgeable signature and passes exactly the one message on by broadcasting to all network connected CPU's, resets the expected time of next resynchronization, and updates its local clock; otherwise, the CPU returns to a wait state.

This method guarantees that the clocks used by correct processors never deviate by more than some maximum amount dmax. During the resynchronization, a clock of a correct processor is never set back. Resynchronization is achieved by creating new clocks and, after a certain period of overlapping existence, discarding the old clocks. The difference between the reading of the new clock and that of the old is always non-negative and never exceeds a fixed amount ADJ.

DESCRIPTION OF THE PREFERRED EMBODIMENT AND INDUSTRIAL APPLICABILITY

The Local Node Execution Environment

Figure 1:
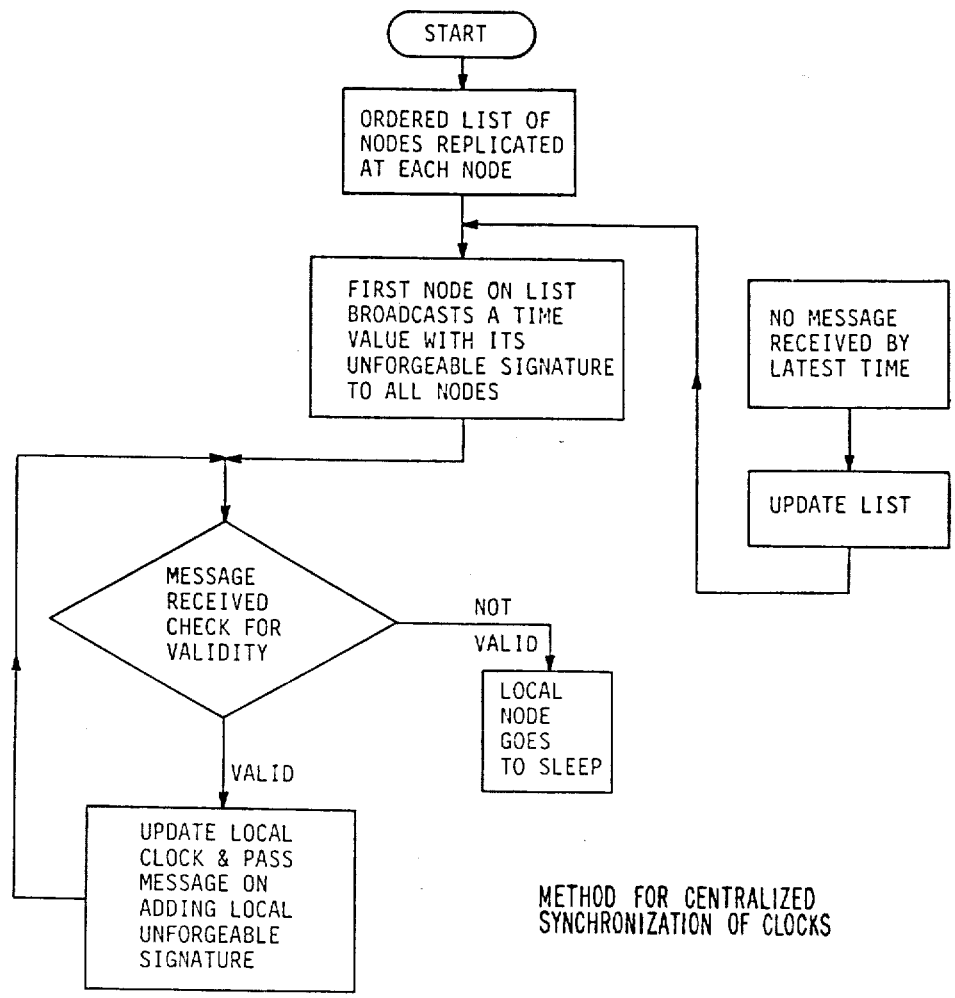
FIG. 1 exhibits a high level decision flow of a centralized clock synchronization according to the copending Halpern et al application.
Figure 5:
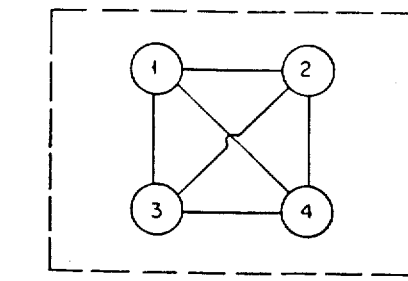
FIG. 5 exhibits a four-node completely connected network of processors and local clocks.

As a preliminary, the method of this invention is executable upon a computing system of the type including one or more CPU's, each having a main store, input/output channel, control unit, direct access storage devices, local addressable clocks, and other I/O devices coupled thereto. Such a system is described in Amdahl et al, U.S. Pat. No. 3,400,371, issued Sept. 3, 1968, and entitled "Data Processing System". The Amdahl system includes as a resource, all of the facilities of either the computing system or of an operating system running thereon which are required for the execution of a process including the method of this invention. Typical resources include a main store, I/O devices, the CPU, data sets, and control or processing programs. Furthermore, such systems are capable of "multiprogramming". The latter pertains to the concurrent execution of two or more processes by a computing system, and can be managed on a computer running under IBM System/370 operating system as described in IBM publication GC28-6646, July 1973, and listed in IBM System/360 bibliography, GA22-6822. Networks of asynchronously operating CPU's are described in Fitzgerald, U.S. Pat. No. 3,940,743, "Interconnecting Unit for Independently Operable Data Processing Systems", issued Feb. 24, 1976, and Antonacco et al, U.S. Pat. No. 4,223,380, "Distributed Multiprocessor Communication System", issued Sept. 16, 1980.

Clock Synchronization Conditions and Assumptions

It is art recognized that clock synchronization in a distributed system must be bounded in several ways. One expression of this was provided by the aforementioned Lamport and Melliar-Smith reference which stated that at any given time, the difference between the times on any two correct processors/clocks is bounded by a constant (dmax) and at the end of each phase, the amount by which any non-faulty clock is increased is bounded by a constant.

In this invention, a distinction is made between real time as measured in an assumed Newtonian time frame that is not directly observable, and clock time, the time measured on some clock. If c is a non-faulty clock, then c(t) denotes the time on clock c as read at real time t.

Let $\rho$ designate a bound on the rate at which c is drifting apart from real time. Further, for the correct functioning of this invention, the following conditions must exist:

Condition 1

There exists a bounded rate $\rho$ at which the time on the clock of a correct processor diverges from real time. The bounded rate of drift is represented by the following relation: $(1+\rho)^{-1}(v-u) < c(v) - c(u) < (1+\rho)(v-u)$, where v and u are real times.

Condition 2

If two processors and the link joining them are non-faulty, then there exists a known upper bound tdel (time delay) on the time required for a short message such as "the time is t" to be prepared, transmitted along a network route, and processed at the receiving node.

Condition 3

The processors are numbered 1,2, ... ,n. If processor i intends to send a message m, then there exists an encoding function $e_i$ such that:
 (a) No processor other than i can generate the message $e_i(m)$. This means that no message can be forged; and
 (b) If processor j receives $e_i(m)$, then it can decode m and determine that i was the processor that sent the message. That is, messages can be authenticated.

Condition 4

All messages sent from processor i to processor j along the route from i to j are received in the order in which they are sent. An alternative condition is that the rate of drift and the number of tolerated faults observe the relation $1 - \rho(\rho+2)f > 0$.

Clocks currently used are efficiently precise as to guarantee $\rho = 10^{-6}$ seconds per second for condition 1. Further a timed delay of tdel=0.1 seconds approximates instances for condition 2. The use of encryption techniques to satisfy the authenticity of a message source (unforgeability of signatures) are well known from Rivest et al, "A Method for Obtaining Digital Signatures and Public Key Crypto Systems", CACM, Vol. 21, No. 2, February 1978. The first half of condition 4 can be guaranteed by the following protocol. All messages from processor i to j are numbered consecutively. If processor j receives a message numbered n, it ignores it until all messages which have a lower number have been received. Note that if $\rho = 10^{-6}$ as above, then the second half of condition 2 holds whenever $f \leq 499,999$.

Flow Diagram Depiction of Centralized Clock Synchronization

Referring now to FIG. 1, there is exhibited a high level decision flow diagram of the method of centralized clock synchronization as set out in the copending Halpern et al application. Residing at each processor/clock node in the network is an ordered list of nodes. First, the first node on the list broadcasts a time value with its unforgeable signature to all other nodes including itself. Next, a message exchange proceeds wherein receiving processors in the network pass such a message on with their own unforgeable signatures to all active processors including themselves. If the message is received within an interval predetermined as a function of the number of signatures, then the time value is accepted as valid and the local clock is set forward. If the time value is not received within the interval, then the first node on the list is replaced with the next node and the replacement node broadcasts an updated time value with its unforgeable signature to all nodes including itself and repeats the message exchange. The first node on the list announces to the other processors what the current time is. Because such a "synchronizer" could be faulty, the ordered list constitutes a method for replacing such a faulty synchronizer.

Task Organization of the Decentralized Clock Synchronization Method According to the Invention Each processor in the network executes a collection of tasks at least one of which is in the wait state. To further the description of the decentralized synchronization method, it is desirable to define terms involving time and clocks, characterize the relevant aspects of the network, and relate these to the task implemented method steps of the invention.

First, synchronization is modeled by starting up a new clock. After the kth synchronization, processor i will have its clock $c_i^k$ running. Since the processors will not be able to agree precisely on when the kth synchronization is to take place, real time is broken up into non-overlapping intervals $INT^k = (BEG^k, END^k)$. In this regard, $BEG^k$ is the time the last non-faulty processor decides to start its kth clock. Likewise, $END^k$ is the time that the first non-faulty processor decides to start up its $k+1$ clock. In this regard, reference should be made to FIG. 4 which shows time divided into intervals.

Initially, all processors start their $c^0$ running simultaneously. For simplicity, this start time is called zero. Mathematically stated, $BEG^0 = c(0) = 0$ for all i. It is of course possible to have other than a simultaneous initial start. The method only requires that all processors start their first clocks within an interval of size no greater than a predetermined constant.

Figure 4:
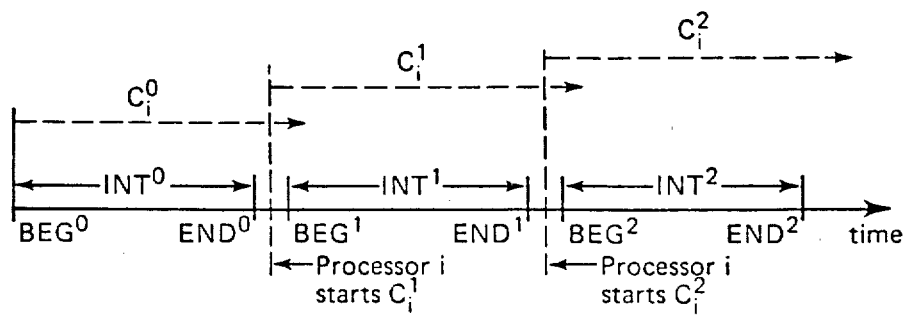
FIG. 4 depicts time broken up into clockable resynchronization intervals.

Typically, the length of an interval $(END^k - BEG^k)$ is of the order of hours while the gap between the intervals $(BEG^{k+1} - END^k)$ is on the order of seconds. In this invention, it is not required that the gap between intervals be timed out. Also, in this invention a processor will use its kth clock for several seconds into the $(k+1)$st interval in order to do the timing for any protocols begun in the kth interval. This is what is shown in FIG. 4 where clock $c_i^0$ overlaps the interval $c_i^0$, $c_i^1$, etc. Also, even if there is a brief overlap period in which two clocks are in use, there is no ambiguity as to which clock to use since all protocols are required to be time stamped.

The following is a list of names of variables and constants.

The constants global to the network are:
per = the synchronization period,
dmax = the maximum deviation of clocks.
The variables local to a particular processor include:
i = its unique processor number, a number in the range of 1,2, ... ,n;
k = the index of the current clock in the range 0,1,2, ...;

$c_i^k$ = an array of clocks in the range between zero to infinity;
$et_i$ = the next scheduled time of synchronization;
$curint_i$ = the current interval.

The primitives for task scheduling include timers and monitors. Timers measure duration of time. A monitor which "wakes up" a processor upon the occurrence of some event such as that of a timer going off will possibly be a wake up message from some other task.

The existence of a broadcast protocol by which one processor can broadcast a message to all the others is assumed. There are many such described in the literature.

Dmax must be chosen as a function of the network topology and the number of faults to be tolerated. Given a network G and upper bounds $f_p, f_l$ on the number of processor and communication link faults respectively, let $brt_G(f_p, f_l)$ be the worst case time to broadcast a message in G with $f_p$ processor faults and $f_l$ communication link faults, provided these faults do not disconnect G:

$$dmax > (1+\rho)brt_G(f_l, f_p) + \rho(\rho+2)per.$$

Note, if there are n nodes in G, then for all $f_l, f_p$, there must be $brt_G(f_l, f_p) < (n-1)tdel$.

Figure 2:
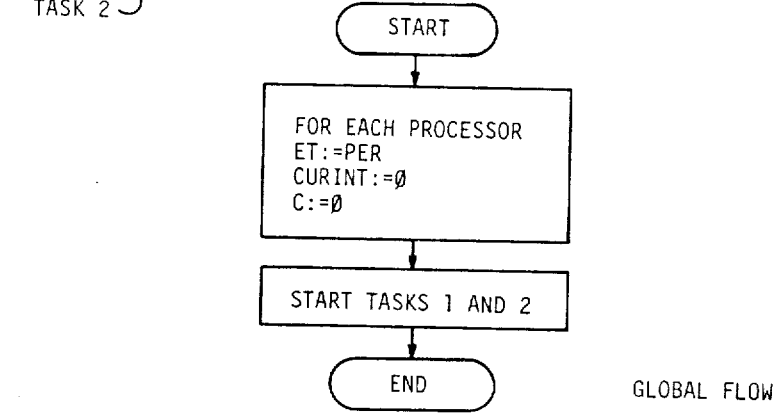

Referring now to FIG. 2, there is shown a global flow for a network of processors. Each processor will have its clocks and intervals initialized to predetermined values after which two tasks are invoked which run perpetually. The first task, termed a "time manager/monitor", is triggered if its clock has attained the current value of et, in which case it signs and broadcasts a message "the time is et" to all other nodes in the network and updates its local clock, interval number, and value of et. The other task, task 2, denominated a "message manager/monitor", is triggered by the receipt of a message. It then tests the validity of the message. If it is valid, the processor signs the message and passes it on to all other processors. It also updates its local clock, interval number, and value of et. This flow is detailed in FIG. 3.

During resynchronization the clock of a correct processor is never set back. Resynchronization is achieved by creating new clocks and, after a certain period of overlapping existence, discarding the old clocks. The difference between the reading of the new clock and that of the old is always non-negative and never exceeds the fixed amount adj.

The Time Management Task (Task 1)

When the current clock of processor i reads et, then the processor signs and sends out an encoded message to all processors saying "the time is et". A new clock is started with time et. Then et and curint are incremented. In pseudocode format:

If c = et then
  begin
    sign and send "the time is et"
    curint: = curint + 1;
    c: = et;
    et: = et + per;
  end.

The Message Manager (Task 2)

Suppose processor i receives an authentic message with s signatures saying "the time is t". This message can be decoded so as to show that it has been signed by s processors and not altered in any way. Consequently, if the message arrives at a "reasonable time", then processor i updates $et_i$ and the current interval (curint) and signs and sends out the message. Otherwise the message is ignored. In pseudocode format:

If processor i receives an authentic message m with s signatures saying "the time is t", then
if (t = et) and (t − s + dmax < c) then
  begin
    sign and send m;
    curint: = curint + 1;
    c: = et;
    et: = et + per;
  end.

Illustrative Example

Suppose that the synchronization interval per is set equal to one hour and the next synchronization is expected at 11:00, i.e. et = 11:00. If any processor has not received a valid message by 11:00 on its clock, where a message is said to be valid if it passes all of the tests of task 2, then task 1 will be executed on that processor. If on the other hand the processor does receive a valid message before 11:00, then task 2 is executed. Once one of these tasks is executed, et is updated to 12:00, so neither task will be executed again in the same period.

Although a valid message may arrive at any time within an interval that has size several multiples of dmax, the correct processors will be synchronized to be within dmin, which is less than dmax, at the beginning of each resynchronization period. If the message provides "the time is t" arrives "early", it is said to be valid, even if it arrives sxdmax before t, where s is the number of signatures. To appreciate the necessity for this aspect, suppose dmax is 0.1 seconds. Further, suppose that processor i receives a message with three signatures stating "the time is 11:00". Lastly, suppose this message arrives 0.3 seconds before 11:00. It follows, that processor i according to the invention, will consider this message valid. Suppose, to the contrary, that processor j is correct and is running 0.1 seconds slower than processor i. Moreover, if processor j receives processor i's message almost instantaneously, processor j will receive the message roughly 0.4 seconds before 11:00 on its clock. Since the message now has four signatures, processor j will also consider it valid. This illustration can be extended to a circumstance in which a fixed bound on the interval in which a message is considered valid that is independent of the number of signatures on the message will simply not work.

Recall that del is the maximum rate at which correct clocks might drift apart. Roughly speaking, all correct clocks and their associated local processors, will decide to synchronize within a real time interval of length $dmin = brt(f_i, f_p)$. Thus, at the beginning of a synchronization interval, that is $BEG^k$ for any k, clocks will be at the most $(1 + \rho)dmin$ apart. During the interval which has a length at most $(1 + \rho)per$, all correct clocks will drift apart at most an extra $del(1 + \rho)per = \rho(2 + \rho)per$. This yields the expression:

$$dmax \geq (1 + \rho)brt(f_i, f_p) + \rho(2 + \rho)per \text{ where:}$$

$$adj = (f_p + 1)dmax, \text{ and } dmin = brt(f_i, f_p).$$

As an illustration, suppose $\rho = 10^{-6}$ seconds, tdel = 0.1 seconds, and the network is completely connected with n processors. It follows as long as there are $f \leq (n - 2)$ failures, then the following values satisfy the conditions of the invention: per = 1 hour, dmin = 0.2 seconds, dmax = 0.21 seconds, and adj = 0.21f seconds.

If a network is restricted to only processor failures, then the following values can be used: per = 1 hour, dmax = 0.11 seconds, dmin = 0.1 seconds, and adj = 0.11f seconds. Note here that dmax is roughly equal to dmin. Lastly, dmin and dmax can both be made smaller by giving the synchronization process high priority in the scheduling of the operating system of each local processor.

The Executable Tasks

Figure 3:
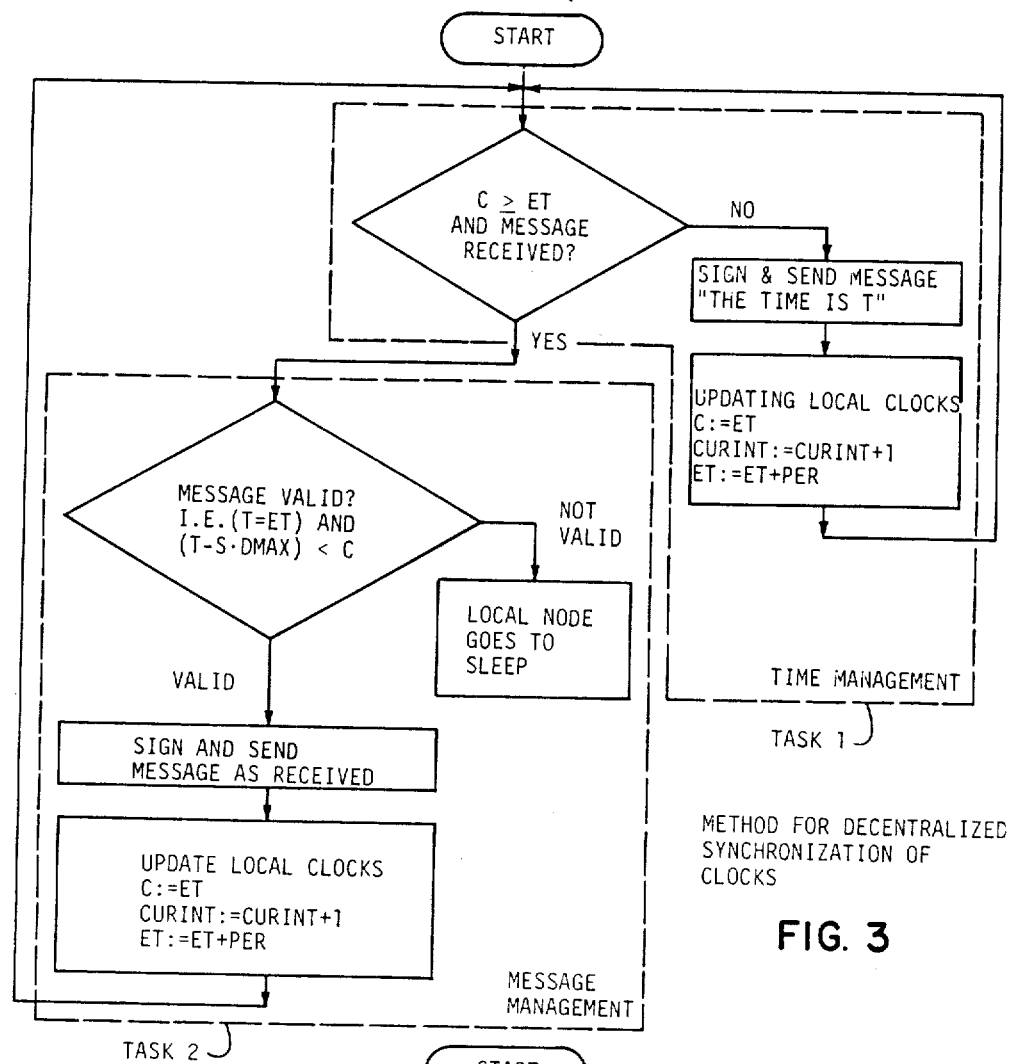
FIGS. 2 and 3 represent the global flow and steps taken at each node for decentralized synchronization of clocks according to the invention.

The enumerated tasks 1 and 2 as shown in FIGS. 2 and 3, are expressible in a high level programming language such as PL/I. In this regard, PL/I is fully described in IBM Systems Reference Library Manual S/360-29, catalog no. GC28-8201-4, 5th Edition, copyrighted December 1972. Reference also should be made to the aforementioned copending Strong et al, U.S. application Ser. No. 06/485,573, filed Apr. 18, 1983, for a discussion of the attributes of monitors, especially wakeup and broadcast monitors and their implementation in each local node execution environment.

A representation of tasks 1 and 2 written in a PL/I subset is included in this specification respectively as counterpart tables 1 and 2. As is customary program expository practice, the instructions occupy the left side of the page with the right side containing comment fields as required. The inclusions of these executable monitors is set forth in order to illustrate, by way of example, the ease with which the method of this invention may be practiced by those possessing skill in this art. Other high level language representations such as PASCAL or ADA might otherwise with equal ease and facility have been drawn.

TABLE 1

```
/* DCFMSYMN PLS3          V0006 ********
DCFMSYMN: PROC OPTIONS(ID);
/*                                                    */
/*             DCFMSYMN                                */
/* SYNCHRONIZATION TIME MONITOR TASK                   */
/*                                                    */
 *    THIS VERSION DATED 26 OCT 1983                   */
/*                                                    */
%INCLUDE SYSLIB(DCFMFRAM);
%INCLUDE SYSLIB(DCFMCLTA);
%INCLUDE SYSLIB(DCFMBYZB);
%INCLUDE SYSLIB(DCFMGVAR);
%INCLUDE SYSLIB(DCFMMASK);
%INCLUDE SYSLIB(PXUOLCBM);
DCL REPORT CHAR(10);        /*  DBG             */
DCL ECBP     POINTER(31);   /*  ECB POINTER     */
DCL OLP      POINTER(31);   /*  OL POINTER      */
DCL TP       POINTER(31);   /*  FRAME POINTER   */
```

TABLE 1-continued

```
DCL FFP         POINTER(31);              /*    FRAME POINTER                          */
DCL FP          POINTER(31);              /*    FRAME POINTER                          */
DCL ECB FIXED(31) BASED(ECBP);            /*    MASK FOR ECB                           */
DCL TIME        FIXED(32);                /*    CURRENT CLUSTER TIME                   */
DCL TIMP        FIXED(32);                /*    CURRENT PROCESSOR TIME                 */
DCL DIFF        FIXED(32);                /*    TIME DIFFERENCE                        */
DCL OLDT        FIXED(32);                /*    REMOVE CLOCKS OLDT AWAY FR NOW         */
DCL OLDC        FIXED(32);                /*    FIRST CLOCK START TIME                 */
DCL IND         FIXED(31);                /*    INDEX IN ORDERED LIST                  */
DCL I           FIXED(31);                /*    COUNTER                                */
DCL J           FIXED(31);                /*    COUNTER                                */
DCL K           FIXED(31);                /*    COUNTER                                */
DCL RTC         FIXED(31);                /*    RETURN CODE FROM PXUOLPTW              */
DCL 1 SYB,                                /*    SYNCHRONIZATION BLOCK                  */
        2 SYCH CHAR(2) INIT('SY'),    /*        INDICATES SYNCHRONIZATION              */
        2 SYBT FIXED(8),                  /*    NMBR OF FAULTS TOLERATED               */
        2 SYN FIXED(8) INIT(0),           /*    NMBR OF TARGETS                        */
        2 SYTIME FIXED(32);               /*    SYNCHRONIZATION TIME                   */
RFY FRAME BASED(TP);
ECBP = SYMECBP$;                          /*    WAKEUP WHEN THIS ECB IS POSTED         */
OLP = SYTIOLP$;                           /*    ORDERED LIST OF CLOCKS                 */
IF DBGSWS$(35)>=1 THEN DO;
    CALL PXUTRACE('ENTER DCFMSYMN',14);   /*    DBG    */
END;  /* DBG */
WAKEUP:
IF CLSYNC-=3 THEN DO;                     /*    NOT IN JOINING STATE                   */
    CALL DCFMTIME(1,0,TIME);              /*    GET CURRENT TIME IN TIME               */
    ?PXUCOMP(TIME,CLSYET,I);              /*    COMPARE TIME WITH CLSYET               */
    IF I>=0 THEN DO;                      /*    SYNCHRONIZE                            */
        /* GENERATE SYNCHRONIZATION MESSAGE                                            */
        REPORT = 'PXUSTPOP';              /*    DBG                                    */
        CALL PXUSTPOP(FFPSCBP$,TP,EMP,ERR);  /*    GET A FRAME                         */
        FRCHAIN = NULL$;
        FRSRCN = MYNAME$;                 /*    SOURCE PROCESSOR                       */
        FRLSRC = '';                      /*    NO SOURCE MAILBOX                      */
        FRNBR = 1;
        FRNFRMS = 1;
        FRNMSGS = 1;
        FRDX = 0;
        FRDEL = ' ';
        FRHOP = 0;
        FRMPRTY = 1;
        FRTGTN = 'BSY';                   /*    BROADCAST TO MAILBOXES 'CSY'           */
        FRLTGT = '';
        FRUL = LENGTH(FRAME)+LENGTH(BYZB);
        IF FRUL>FRMSIZE$ THEN DO;     /*    MULTI-FRAME MSG REQ                        */
            FFP = TP;                 /*    MSG PTR                                    */
            K = FRUL-FRMSIZE$;        /*    EXTRA SPACE REQUIRED                       */
            J = FRMSIZE$-LENGTH(FRHDR);  /*    SPACE ON SUBSEQUENT FRMS                */
            J = (K+J-1)/J;            /*    NUMBER ADDITIONAL FRMS REQ                 */
            FRUL = FRMSIZE$;
            FRNFRMS = J+1;
            DO I=2 TO J+1;            /*    ACQUIRE EXTRA FRAMES                       */
                FP = TP;              /*    PREVIOUS FRAME                             */
                REPORT = 'PXUSTPOP';  /*    DBG                                        */
                CALL PXUSTPOP(FFPSCBP$,TP,EMPI,ERR);   /*    GET A FRAME               */
                FP->FRCHAIN = TP;     /*    CHAIN FRAMES                               */
                ?PXUMOVE(,FP,,TP,LENGTH(FRHDR));   /*    COPY HDR                      */
                FRNBR = 1;
                FRCHAIN = NULL$;
                FRUL = MIN(K+LENGTH(FRHDR),FRMSIZE$);  /*    SP ON THIS FRM            */
                K = K+LENGTH(FRHDR)-FRUL;  /*    ADDITIONAL SP REQ                     */
            END;  /* OF DO I=2 TO J+1 */
            TP = FFP;                 /*    PTR TO MSG                                 */
            /* FILL IN BBIB AND BYTIME                                                 */
            SYBT = CLCONN;            /*    NUMBER OF FAULTS TOLERATED                 */
            SYTIME = CLSYET;          /*    SYNCHRONIZATION TIME                       */
            REPORT = 'DCFMREPL';      /*    DBG                                        */
            CALL DCFMREPL(TP,ADDR(FRTEXT),ADDR(SYB),LENGTH(SYB),ERR);
        END;  /* OF IF FRUL>FRMSIZE$ */
        ?DCFUIDG(FRMID);                  /*    GENERATE MESSAGE ID                    */
        CALL DCFMBY(TP,ERR);              /*    BYZANTINE AUTHENTICATION               */
        /* END OF SYNCHRONIZATION MESSAGE GENERATION                                   */
        ?PXUGTIME(TIMP);                  /*    GET PROCESSOR TIME                     */
        DIFF = CLSYET-TIMP;               /*    GET DIFF                               */
        REPORT = 'PXUOLPTW';              /*    DBG                                    */
        CALL PXUOLPTW(OLP,CLSYET,DIFF,RTC,ERR);   /*    START NEW CLOCK                */
        IF RTC-=0 THEN GOTO ERR;
        IND = 0;
        OLDT = 256*CLSYPER;               /*    CLOCKS REMOVED OUTSIDE THIS INT        */
        DO WHILE(IND=0);                  /*    REMOVE OLD CLOCKS                      */
            REPORT = 'PXUOLGTN';          /*    DBG                                    */
```

TABLE 1-continued

```
        CALL PXUOLGTN(OLP,IND,TP,OLDC,ERR);           /* OLDC=KEY OF 1ST CLOCK */
        IF (IND>0)&((CLSYET-OLDC)>OLDT) THEN DO;
              REPORT = 'PXUOLRM';         /*    DBG                              */
              CALL PXUOLRM(OLP,1,ERR);    /*    REMOVE 1ST CLOCK                 */
              IND = 0;                    /*    GET NEXT CLOCK                   */
        END;   /* OF (CLSYET-OLDC)>OLDT   */
        ELSE IND=1;                       /*    STOP                             */
     END;   /* OF DO WHILE IND=0 */
     IF CLSYNC-=1 THEN CLSYET = CLSYET+(128*CLSYPER);      /* ADD PER             */
     IF CLSYNC=2 THEN CLSYNC = 0;          /*  RETURN TO NORMAL STATE            */
     IF CLSYNC=1 THEN DO;                  /*  ADVANCE TO UNSCHED 2              */
        CLSYNC = 2;
        CLSYET = CLSYET+2*(CLCONN+2)*CLDMAX;               /* SPECIAL PERIOD     */
     END;   /* OF CLSYNC=1 */
  END;   /* OF IF I>=0 */
  DIFF = CLSYET-TIME;                      /*   GET DIFF                          */
  ?PXUTIMER(DIFF,ECBP);                    /*   SET TIMER FOR DIFF                */
END;   /* OF IF CLSYNC-=3  */
DONE:
IF DBGSWS$(35)>=1 THEN DO;
  CALL PXUTRACE('DCFMSYMN WAITS ON ECBP',22);      /*   DBG   */
  CALL PXUDHEX(ECBP,4);    /* DBG  */
END;   /* DBG  */
CALL PXURWAIT(ECBP);                     /*   WAIT ON ECB                         */
ECB = 0;                                 /*   CLEAR ECB                           */
IF DBGSWS$(35)>=1 THEN DO;
  CALL PXUTRACE('ENTER DCFMSYMN',14);    /*   DBG   */
END;   /* DBG  */
GOTO WAKEUP;
EMP1:
REPORT ='DCFMFREE';                      /*   DBG                                 */
CALL DCFMFREE(FFP,ERR);                  /*   RELEASE FRAMES ACQUIRED             */
EMP:
CALL PXUPAUSE;                           /*   RELINQUISH CONTROL TO SCHEDULER     */
GOTO WAKEUP;
ERR:
IF DBGSWS$(15)-=0 THEN CALL PXUTRACE('DCFMSYMN ERROR',14);
CALL PXUSTOP(REPORT);
END DCFMSYMN ;
```

TABLE 2

```
/*  DCFMSYMG PLS3                   V0004 ********                              */
DCFMSYMG: PROC OPTIONS(ID);
/*                                                                              */
/*                      DCFMSYMG                                                */
/*  SYNCHRONIZATION MESSAGE MANAGER TASK                                        */
/*                                                                              */
/*  THIS VERSION DATED 27 OCT 1983                                              */
/*                                                                              */
%INCLUDE SYSLIB(DCFMFRAM);
%INCLUDE SYSLIB(DCFMCLTA);
%INCLUDE SYSLIB(DCFMBYZB);
%INCLUDE SYSLIB(DCFMGVAR);
%INCLUDE SYSLIB(DCFMMASK);
%INCLUDE SYSLIB(PXUOLCBM);
DCL REPORT CHAR(10);                    /*  DBG                                 */
DCL BSLT CHAR(4) INIT('CSY');           /*  MAILBOX FOR THIS TASK               */
DCL QSP      POINTER(31);               /*  SLOT POINTER                        */
DCL QCBP     POINTER(31);               /*  QCB POINTER                         */
DCL ECBP     POINTER(31);               /*  ECB POINTER                         */
DCL OLP      POINTER(31);               /*  OL POINTER                          */
DCL TP       POINTER(31);               /*  FRAME POINTER                       */
DCL ECB FIXED(31) BASED(ECBP);          /*  MASK FOR ECB                        */
DCL TIME     FIXED(32);                 /*  CURRENT CLUSTER TIME                */
DCL TIMP     FIXED(32);                 /*  CURRENT PROCESSOR TIME              */
DCL DIFF     FIXED(32);                 /*  TIME DIFFERENCE                     */
DCL OLDT     FIXED(32);                 /*  REMOVE CLOCKS OLDT AWAY FR NOW      */
DCL OLDC     FIXED(32);                 /*  FIRST CLOCK START TIME              */
DCL ADDT     FIXED(32);                 /*  PERIOD FR UNS1 TO UNS2              */
DCL IND      FIXED(31);                 /*  INDEX IN ORDERED LIST               */
DCL RTC      FIXED(31);                 /*  RETURN CODE FROM PXUOLPTW           */
DCL K        FIXED(31);                 /*  COUNTER                             */
DCL CHK      FIXED(31);                 /*  COUNTER                             */
DCL DMAX     FIXED(32);                 /*  ASSUMED MAX DEV OF CORR CLOCKS      */
DCL FFP      POINTER(31);               /*  PTR TO CURRENT MESSAGE              */
DCL BYZBP    POINTER(31);               /*  PTR TO CONTIG   MSG    BYZB         */
DCL BP       POINTER(31);               /*  PTR TO          MSG    BYZB         */
DCL EP       POINTER(31);               /*  PTR TO END      MSG    BYZB         */
DCL ZB CHAR(LENGTH(BYZB));              /*  SPACE FOR CONTIG BYZB IF NOT ON 1   */
DCL ZL FIXED(31) INIT(LENGTH(BYZB));    /*     LENGTH OF BYZB                   */
```

TABLE 2-continued

```
DCL MSIG BIT(32);                              /* SIGNATURE SET AS BIT MAP               */
DCL NMSIG FIXED(31);                           /* CARDINALITY OF SIGNATURE SET           */
RFY FRAME BASED(TP);
RFY BYZB BASED(BYZBP);
START:
REPORT = 'DCFMLD';                             /* DBG                                    */
CALL DCFMLD(BSLT,QSP,QCBP,ECBP,ERR);           /* GET MAILBOX                            */
OLP = SYTIOLP$;                                /* ORDERED LIST OF CLOCKS                 */
MSIG = 0;                                      /* ZERO MSIG                              */
NMSIG = 1;
K = MYNBR$;
?PXUBIT(SET,ADDR(MSIG),K);                     /* SET BIT FOR OWN SIG                    */
IF DBGSWS$(35)> = 1 THEN DO;
    CALL PXUTRACE('ENTER DCFMSYMG',14);        /* DBG */
END; /* DBG */
WAKEUP:
REPORT = 'PXUSQNXP';                           /* DBG                                    */
TP = NULL$;
CALL PXUSQNXP(QCBP,TP,DONE,ERR);               /* GET 1ST MESSAGE                        */
/* AUTHENTICATE MESSAGE ***                                                              */
REPORT = 'DCFMRECV';                           /* DBG                                    */
CALL DCFMRECV(QSP,TP,ERR);                     /* REMOVE MSG FROM SLOT                   */
FFP = TP;
BP = ADDR(FRTEXT);                             /* PTS TO BEGINNING OF BYZB               */
BYZBP = ADDR(ZB);                              /* PTS TO CONTIG SPACE FOR BYZB           */
IF DBGSWS$(35)> = 1 THEN DO;
    CALL PXUTRACE('DCFMSYMG TO GATHER BYZB',23);                /* DBG */
    CALL PXUDHEX(TP,4);     /*    DBG    */
    CALL PXUDHEX(BP,4);     /*    DBG    */
    CALL PXUDHEX(BYZBP,4);  /*    DBG    */
    CALL PXUDHEX(ZL,4);     /*    DBG    */
    CALL PXUDHEX(EP,4);     /*    DBG    */
    CALL PXUDHEX(FRUL,2);   /*    DBG    */
END; /* DBG */
/* GATHER BYZB IF ERROR THEN GOTO REM ***                                                */
CALL DCFMGATH(TP,BP,BYZBP,ZL,EP,REM);          /* GATHER CONTIG BYZB                     */
IF DBGSWS$(35)> = 2 THEN DO;
    CALL PXUTRACE('DCFMSYMG BYZB',13);         /* DBG    */
    CALL PXUDHEX(TP,4);     /*    DBG    */
    CALL PXUDHEX(FRAME,LENGTH(FRAME));         /* DBG    */
    CALL PXUDHEX(BYZB,ZL);  /*    DBG    */
END; /* DBG */
IF BYCH-='SY' THEN GOTO REM;                   /* DISCARD MESSAGE                        */
IF DBGSWS$(35)> = 1 THEN DO;
    CALL PXUTRACE('DCFMBYMG CALLS DCFMAUTH',23);               /* DBG    */
END; /* DBG */
CALL DCFMAUTH(FFP,BYZBP,EP,REM);
IF DBGSWS$(35)> = 1 THEN DO;
    CALL PXUTRACE('DCFMBYMG RET FR DCFMAUTH',24);              /* DBG    */
END; /* DBG */
/* END OF MESSAGE AUTHENTICATION ***                                                     */
DMAX = CLDMAX;                                 /* STANDARD DMAX                          */
IF CLSYNC=2 THEN DMAX = 2*DMAX;                /* DMAX AFTER JOIN IN UNSCHED2            */
ADDT = 2*(CLCONN+2)*CLDMAX;                    /* PER FR UNS1 TO UNS2                    */
IF CLSYNC-=3 THEN DO;                          /* NOT JOINING                            */
    IF BYTIME=CLSYET THEN DO;                  /* EXPECTED SYNC TIME                     */
        CALL DCFMTIME(1,0,TIME);               /* GET CURRENT TIME IN TIME               */
        TIME = TIME+(BYSIG*DMAX);              /* MUST BE > BYTIME                       */
        ?PXUCOMP(TIME,BYTIME,K);               /* CONPARE TIME WITH BYTIME               */
        IF K>0 THEN DO;                        /* VALID SYNC MESSAGE                     */
            FRTGTN = 'BSY';                    /* BROADCAST               TO 'CSY'       */
            REPORT = 'DCFMSIGN';               /* DBG            */
            CALL DCFMSIGN(FFP,BP,BYZBP,CHK,ERR);            /* SIGN MESSAGE              */
            REPORT = 'DCFMSEND';               /* DBG                                    */
            CALL DCFMSEND(FFP,RTC,ERR);        /* SEND                                   */
            ?PXUGTIME(TIMP);                   /* GET PROCESSOR TIME                     */
            DIFF = CLSYET-TIMP;                /* GET DIFF                               */
            REPORT = 'PXUOLPTW';               /* DBG                                    */
            CALL PXUOLPTW(OLP,CLSYET,DIFF,RTC,ERR);         /* START NEW CLOCK           */
            IF RTC-=0 THEN GOTO ERR;
            IND = 0;
            OLDT = 256*CLSYPER;                /* CLOCKS REMOVED OUTSIDE THIS INT        */
                                               /* THE INTERVAL IS TWICE PERIOD           */
            DO WHILE(IND=0);                   /* REMOVE OLD CLOCKS                      */
            REPORT = 'PXUOLGTN';               /* DBG                                    */
            CALL PXUOLGTN(OLP,IND,TP,OLDC,ERR);             /* OLDC=KEY OF 1ST CLK       */
            IF (IND>0)&((CLSYET-OLDC)>OLDT) THEN DO;
                REPORT = 'PXUOLRM';            /* DBG                                    */
                CALL PXUOLRM(OLP,1,ERR);       /* REMOVE 1ST CLOCK                       */
                IND = 0;                       /* GET NEXT CLOCK                         */
            END; /* OF (CLSYET-OLDC)>OLDT    */
            ELSE IND=1;                        /* STOP                                   */
```

TABLE 2-continued

```
        END;  /* OF DO WHILE IND=0      */
     IF CLSYNC-=1 THEN CLSYET = CLSYET+(128*CLSYPER);        /* ADD PER              */
     IF CLSYNC=2 THEN DO;           /* RETURN TO NORMAL STATE                        */
        CLSYNC = 0;
        MSIG = 0;                   /* ZERO MSIG                                     */
        NMSIG = 1;
        K = MYNBR$;
        ?PXUBIT(SET,ADDR(MSIG),K);   /* SET BIT FOR OWN SIG                          */
     END;  /* OF IF CLSYNC=2         */
     IF CLSYNC=1 THEN DO;           /* ADVANCE TO UNSCHED 2                          */
        CLSYNC = 2;
        CLSYET = CLSYET+ADDT;       /* SPECIAL PERIOD                                */
        MSIG = MSIG|BYBITS;         /* MSIG = MSIG UNION SIGS ON MSG                 */
        ?PXUBIT(COUNT,ADDR(MSIG),LENGTH(MSIG),NMSIG);        /* |MSIG|               */
     END;  /* OF CLSYNC=1            */
  END;     /* OF IF K=0              */
END;       /* OF IF BYTIME=CLSYET    */
  ELSE IF (CLSYNC=2)&(CLSYET=(BYTIME+ADDT)) THEN DO;
     IF NMSIG<CLCONN+1 THEN DO;     /* MAY NEED TO FORWARD MSG                       */
        MSIG = MSIG|BYBITS;         /* MSIG = MSIG UNION SIGS ON MSG                 */
        ?PXUBIT(COUNT,ADDR(MSIG),LENGTH(MSIG),K);            /* K = |MSIG|           */
        IF K>NMSIG THEN DO;         /* SIGN AND SEND MSG TO ALL                      */
           FRTGTN = 'BSY';          /* BROADCAST        TO 'CSY'                     */
           REPORT = 'DCFMSIGN';     /* DBG                                           */
           CALL DCFMSIGN(FFP,BP,BYZBP,CHK,ERR);   /* SIGN MESSAGE                    */
           REPORT = 'DCFMSEND';     /* DBG                                           */
           CALL DCFMSEND(FFP,RTC,ERR);   /* SEND                                     */
        END;  /* OF IF K>NMSIG       */
        NMSIG = K;                  /* NMSIG = |MSIG|                                */
     END;  /* OF IF NMSIG<CLCONN+1   */
  END;     /* OF ELSE ...            */
END;       /* OF IF CLSYNC-=3        */
  ELSE IF CLSYNC=3 THEN DO;         /* JOINING                                       */
     IF BYTIME=CLSYET THEN DO;      /* EXPECTED SYNC TIME                            */
        MSIG = MSIG|BYBITS;         /* MSIG = MSIG UNION SIGS ON MSG                 */
        ?PXUBIT(COUNT,ADDR(MSIG),LENGTH(MSIG),NMSIG);        /* |MSIG|               */
        IF NMSIG>CLCONN THEN DO;    /* ENOUGH SIGNATURES                             */
           REPORT = 'PXUOLRMA';
           CALL PXUOLRMA(OLP,ERR);   /* REMOVE ALL CLOCKS                            */
           ?PXUGTIME(TIMP);          /* GET PROCESSOR TIME                           */
           DIFF = CLSYET-TIMP;       /* GET DIFF                                     */
           REPORT = 'PXUOLPTW';      /* DBG                                          */
           CALL PXUOLPTW(OLP,CLSYET,DIFF,RTC,ERR);            /* START NEW CLOCK     */
           IF RTC-=0 THEN GOTO ERR;
           CLSYNC = 2;
           CLSYET = CLSYET+ADDT;     /* SPECIAL PERIOD                               */
           CALL PXUFPOST(SYMECBP$,0); /* WAKE TIME MONITOR                           */
        END;  /* OF IF NMSIG>CLCONN  */
     END;  /* OF IF BYTIME=CLSYET    */
  END;  /* OF ELSE CLSYNC=3          */
REM;
GOTO WAKEUP;
DONE:
IF DBGSWS$(35)>=1 THEN DO;
  CALL PXUTRACE('DCFMSYMG WAITS ON ECBP',22);              /* DBG */
  CALL PXUDHEX(ECBP,4);    /*     DBG     */
END;  /* DBG */
CALL PXURWAIT(ECBP);                 /* WAIT ON ECB                                  */
ECB = 0;                             /* CLEAR ECB                                    */
IF DBGSWS$(35)>=1 THEN DO;
  CALL PXUTRACE('ENTER DCFMSYMG',14);    /* DBG     */
END;  /* DBG */
GOTO WAKEUP;
ERR:
IF DBGSWS$(35)-=0 THEN CALL PXUTRACE('DCFMSYMG ERROR',14);
CALL PXUSTOP(REPORT);
END DCFMSYMG;
```

Having shown and described one embodiment of this invention, those skilled in this art will appreciate that many variations and modifications can be made to practice the invention and still be within the spirit and scope thereof. Thus, the invention is intended to be limited only by the claimed matter as indicated in the attached claim set.

We claim:

1. A decentralized method for periodically synchronizing local clocks in a network of counterpart message sending and receiving CPU's, both the drift rate between the clocks and the network message transit and processing times between sending and receiving CPU's being bounded, comprising the steps at each CPU in the network of:

(a) ascertaining whether a time value message has been received at the CPU within a current synchronizing interval;

(b) if said message has not been received within said interval, then originating and broadcasting to all network connected CPU's exactly one time value message, appending thereto its unforgeable signature, resetting the expected time of next resynchronization, and updating its local clock;

(c) ascertaining whether any locally received message is valid according to whether said message was received within a period determined as a function of the number of signatures appending the message; and (d) if said received message is valid, then appending thereto the unforgeable signature of the CPU to the received message, and passing exactly the one received message on by broadcasting to all network connected CPU's, resetting the expected time of next resynchronization, and updating its local clock; otherwise, returning the CPU to a wait state in the event that the received message is not valid.

2. A method according to claim 1, wherein the network is tolerant of any number of faults which do not disconnect the network.

3. A method according to claim 1, wherein during the broadcasting of a time value message further includes the steps of creating new clocks and after a period of overlapping existence discarding old clocks, the difference between the new clock and the old clock readings being positive and never exceeding a fixed amount.

4. A method according to claim 1, wherein for a network of n nodes, the number of messages required to reach synchronization is at most $n^2$.

5. A method according to claim 1, wherein at any given real time, the difference between the times of the local clocks of any two counterpart CPU's is bounded by a constant.

6. A decentralized method for periodically synchronizing local clocks in a network of counterpart communicating processors, both the drift rate ($\rho$) between the clocks and the network message transit and processing times (tdel) between sending and receiving processors being bounded, comprising the steps at each processor of:

(a) ascertaining whether a time value message has been received within a current synchronizing interval;

(b) if said message has not been received within said interval, then originating and broadcasting to all processors exactly one time value message ("the time is t"), appending to said message its unforgeable signature, resetting the expected time of next resynchronization, and updating its local clock;

(c) ascertaining whether a received message is valid according as to whether said message was received within the current synchronizing interval, said validity being determined as a function of the number of signatures appending the message, all messages generated from any first to any second processor being numbered consecutively such that a second processor receiving a message numbered k ignores said message until all messages having a numerical value k have been received; and (d) if said received message is valid, then appending thereto the unforgeable signature of the processor and passing exactly the one message on by broadcasting to all processors, resetting the expected time of next resynchronization (et) according to the received message and updating its local clocks; otherwise, if the received message is not valid, the processor returns to a wait state.

7. A method according to claim 6, wherein if after the occurrence of the duration of tdel a message with a number less than k has not been received, then message number k is ignored.

8. A method according to claim 6, wherein if a message has not been received within said interval, the step of resetting local clocks includes the steps of incrementing a current interval counter curint:=curint+1, and resetting the next scheduled time of synchronization et:=et+per, where per designates the synchronization period.

9. A method according to claim 6, wherein the step of ascertaining whether a received message saying "the time is t" is valid includes the steps of testing whether t=et and whether (t−s*dmax)<c, where s is the number of unforgeable signatures appending the received message, dmax is the maximum deviation of clocks, and c is the correct clock time.

10. A method according to claim 6, wherein in a completely connected network of processors with no link failures, said network being characterized by dmax=tdel+$\rho$per, where $\rho$ is the maximum rate of drift between correct clocks, per is the synchronization period, tdel is the worst case transmission and processing delay and dmax is the maximum deviation of clocks.

11. A method according to claim 6, wherein each correct processor sends n synchronization messages during each synchronization interval.

* * * * *